(12) United States Patent
Noyes et al.

(10) Patent No.: US 8,408,501 B2
(45) Date of Patent: Apr. 2, 2013

(54) HOSE CLAMP FOR TRACTOR RIG

(75) Inventors: Douglas B. Noyes, Upland, CA (US); Thomas Dale Peterson, La Verne, CA (US); Patrick Eugene Lewis, Tustin, CA (US)

(73) Assignee: R.A. Phillips Industries, Inc., Santa Fe Springs, CA (US)

( * ) Notice: Subject to any disclaimer, the term of this patent is extended or adjusted under 35 U.S.C. 154(b) by 605 days.

(21) Appl. No.: 12/191,504

(22) Filed: Aug. 14, 2008

(65) Prior Publication Data

US 2009/0200434 A1    Aug. 13, 2009

Related U.S. Application Data

(60) Provisional application No. 61/027,128, filed on Feb. 8, 2008.

(51) Int. Cl.
*A62C 13/76*    (2006.01)
(52) U.S. Cl. ........ 248/75; 248/68.1; 248/74.1; 248/74.2
(58) Field of Classification Search ............... 248/58, 248/62, 63, 74.1, 74.2, 67.7, 75, 68.1; 137/351; 280/420, 422; D12/223
See application file for complete search history.

(56) References Cited

U.S. PATENT DOCUMENTS

| 3,650,545 | A | | 3/1972 | Freed | |
|---|---|---|---|---|---|
| 4,358,082 | A | | 11/1982 | Reeves | |
| 4,881,705 | A | * | 11/1989 | Kraus | 248/74.2 |
| 5,271,587 | A | * | 12/1993 | Schaty et al. | 248/68.1 |
| 5,363,539 | A | * | 11/1994 | Tisol | 24/543 |
| 5,785,285 | A | * | 7/1998 | Gordon | 248/68.1 |
| 6,565,049 | B2 | * | 5/2003 | Hahn | 248/68.1 |
| 6,902,180 | B2 | | 6/2005 | Baginski | |
| 7,086,659 | B2 | | 8/2006 | Baginski | |
| 7,387,282 | B2 | * | 6/2008 | Kovac | 248/68.1 |
| 2007/0278358 | A1 | * | 12/2007 | Clark | 248/74.1 |

* cited by examiner

*Primary Examiner* — Gwendolyn W Baxter
(74) *Attorney, Agent, or Firm* — Christie, Parker & Hale, LLP

(57) ABSTRACT

A hose clamp includes a hanger configured to be suspended from a harness. A clasp defines lower pockets and is rotatably attached to the hanger by a hinge. The clasp is configured to rotate about the hinge between an open position, in which flexible lines can be laid into the pockets, and a closed position in which the hanger and the clasp together surround and capture the lines in the respective pockets. A latch is configured to latch the clasp in the closed position.

12 Claims, 13 Drawing Sheets

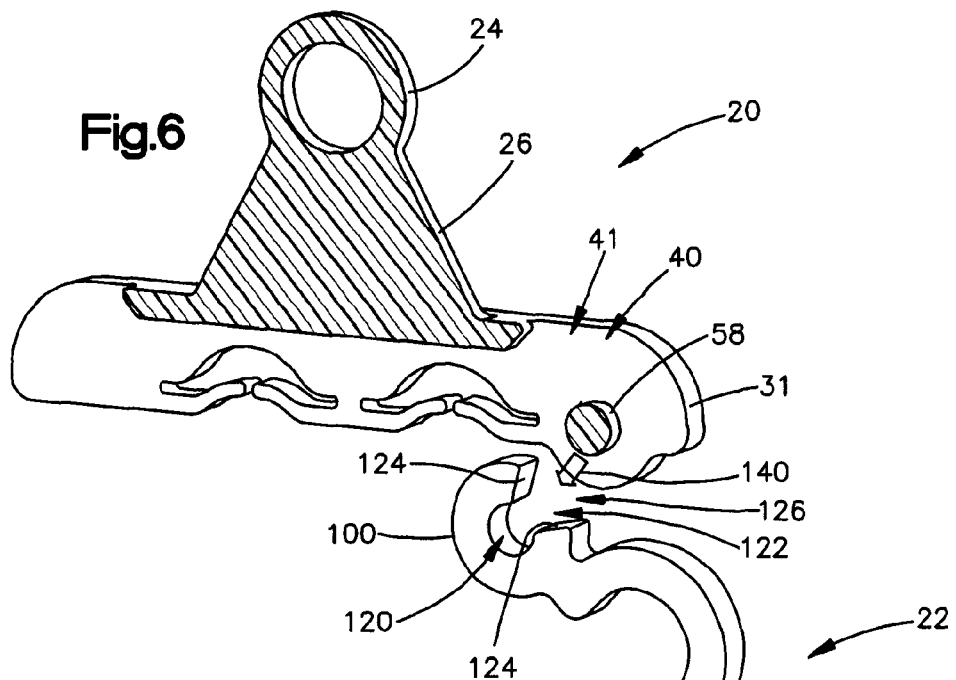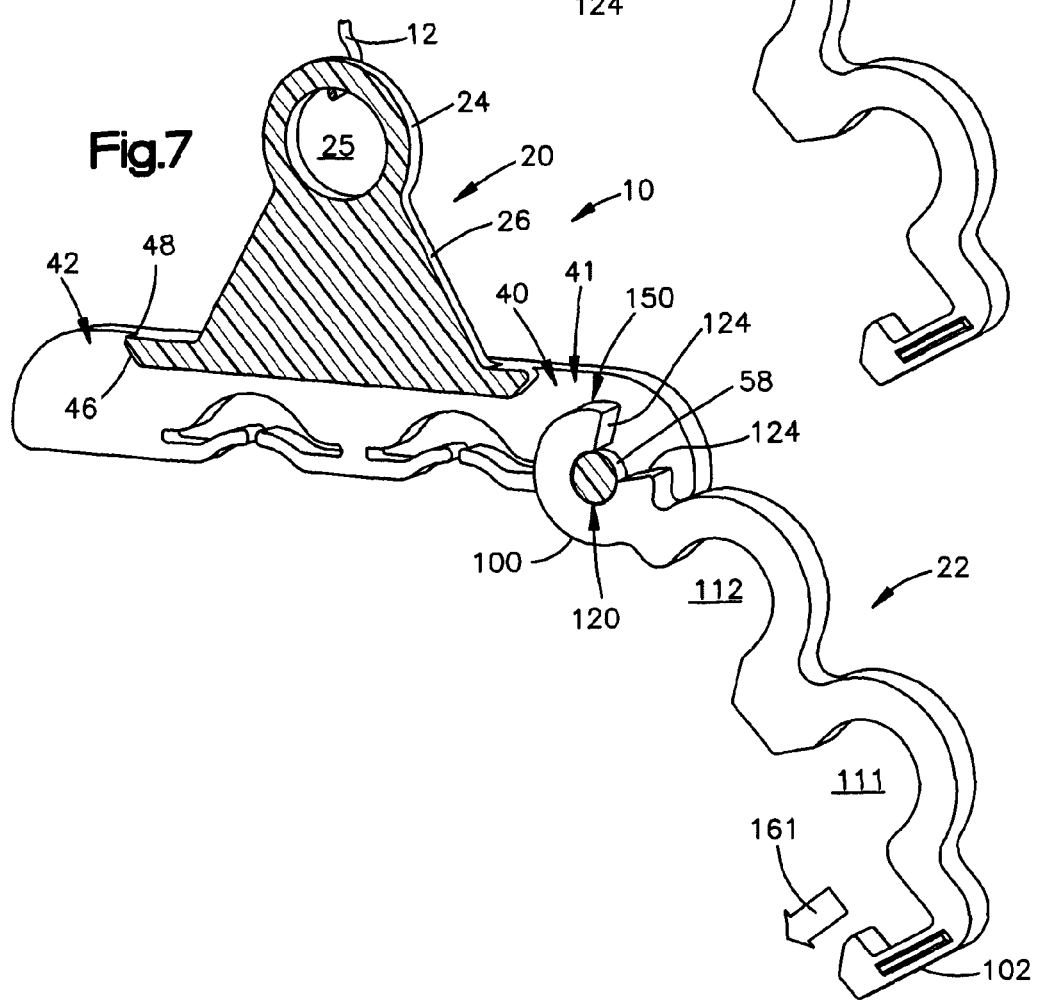

HOSE CLAMP FOR TRACTOR RIG

CROSS-REFERENCE TO RELATED APPLICATION

This application claims the benefit of U.S. Provisional Application No. 61/027,128, filed Feb. 8, 2008, hereby incorporated herein by reference.

TECHNICAL FIELD

The application relates to devices for supporting flexible lines.

BACKGROUND

A tractor trailer rig includes two vehicles: a tractor in which a driver sits, and a trailer pulled by the tractor. Supply lines, including hose lines and electric cables, extend from the tractor to the front of the trailer. At a location between the tractor and the trailer, the supply lines are supported by a hose clamp that is suspended from the tractor by a harness.

SUMMARY

A hose clamp includes a hanger configured to be suspended from a harness. A clasp defines lower pockets and is rotatably attached to the hanger by a hinge. The clasp is configured to rotate about the hinge between an open position, in which flexible lines can be laid into the pockets, and a closed position in which the hanger and the clasp together surround and capture the lines in the respective pockets. A latch is configured to latch the clasp in the closed position.

The clamp preferably has the following features: The hinge includes a hinge pin molded as a one-piece unit with the hanger and a hinge knuckle molded as a one-piece unit with the clasp. The pin is configured to be snapped into the knuckle by a user. The pockets are between the latch and the hinge. The hanger includes a ledge, and the latch includes a finger that projects toward the hinge and is configured to rest on the ledge to latch the clasp in the closed position. The clamp requires the finger to be moved in a direction directed away from the hinge in order to unlatch the clasp. The clasp includes, between each neighboring pair of pockets, a projection that projects into a gap in the hanger when the clasp is in the closed position, for surfaces of the hanger bounding the gap to inhibit contortion of the clasp. The hanger is located on mutually-perpendicular lateral and transverse axes and, in the clasp's closed position, the lower pockets are spaced laterally apart, and the hanger has, above each lower pocket, two hose-engaging surfaces spaced transversely apart.

BRIEF DESCRIPTION OF THE DRAWING

FIGS. 6-9 are perspective sectional views illustrating a sequence of steps for attaching the clasp to the hanger to form the clamp and for moving the clasp toward a closed position.

DETAILED DESCRIPTION

Overview

Figure 1:
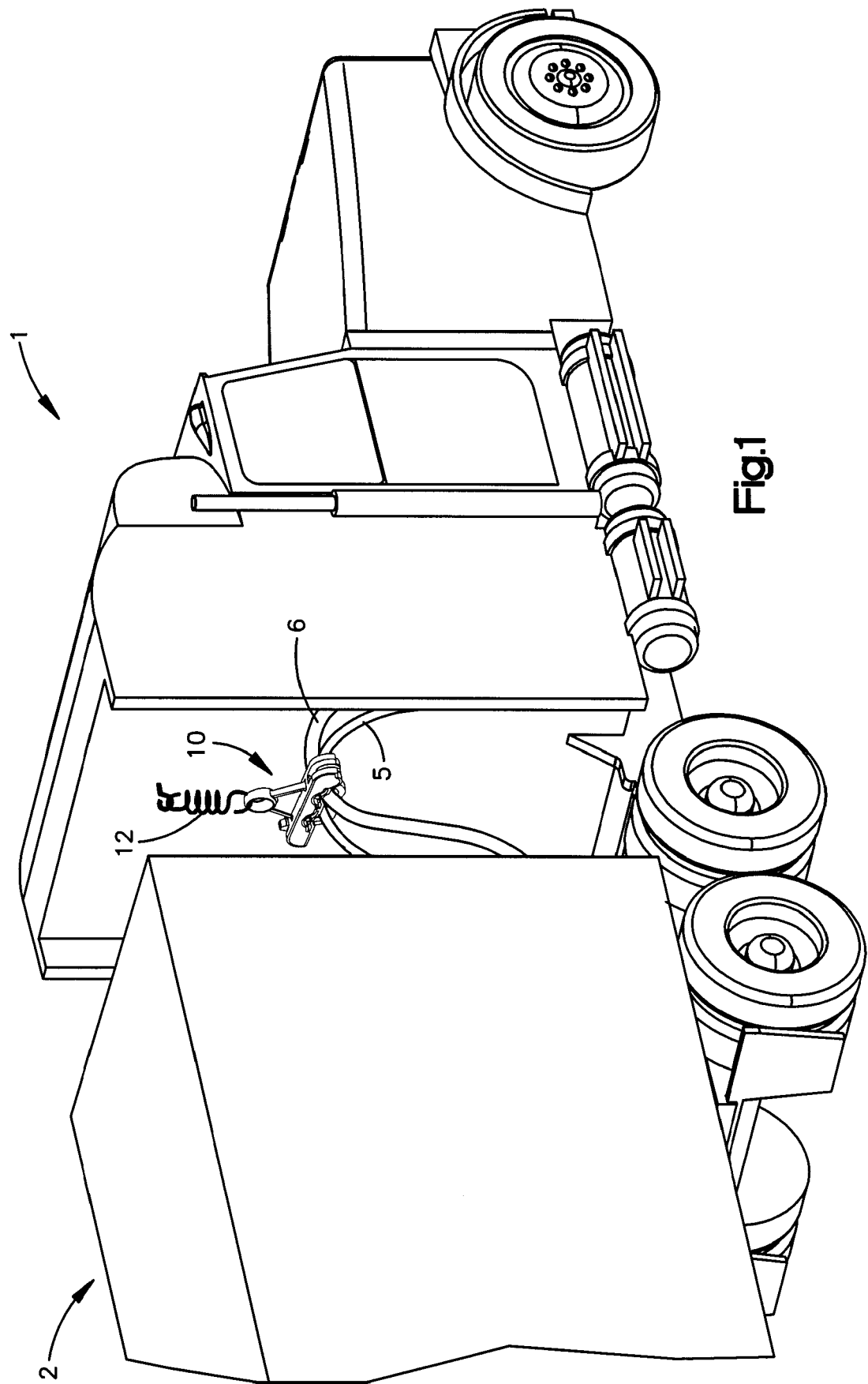
FIG. 1 is a perspective view of a two-pocket hose clamp attached to a tractor trailer rig.

The figures and the following description provide examples of the elements recited in the claims. These examples enable a person of ordinary skill in the art to make and use the invention, including best mode, without implying limitations not recited in the claims. In the following description, directional terms, such as downward, bottom, left and horizontally, are designated with the respect to parts' orientations as they happen to be shown in the drawings.

Figure 2:
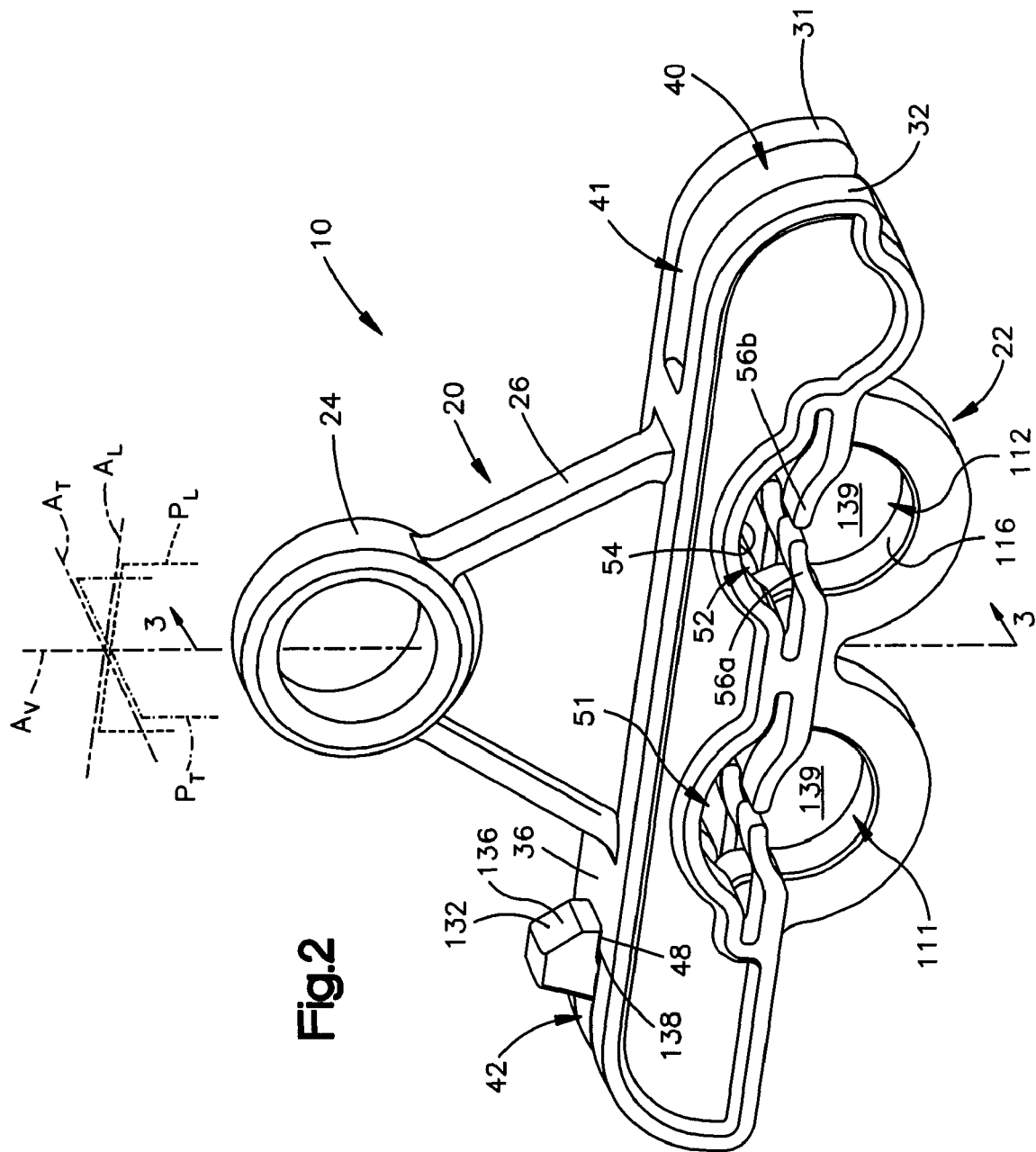
FIG. 2 is an enlarged perspective view of the clamp, including a hanger and a clasp of the clamp, shown in relation to three orthogonal axes.

FIG. 1 shows a tractor trailer rig, which includes a tractor 1 and a trailer 2. Two flexible lines 5 and 6, in this example hose lines, extend from the tractor 1 to the trailer 2. The lines 5 and 6 extend through, and are supported by, a hose clamp 10. The clamp 10 is suspended from a harness 12 that is attached to the tractor 1. As shown in FIG. 2, the clamp 10 in this example has only two parts: a hanger 20 and a clasp 22, each molded as a one-piece unitary plastic part.

Hanger of the Clamp

As shown in FIG. 2, the hanger 20 can be described with reference to mutually perpendicular axes: a central axis $A_V$, a lateral axis $A_L$, and a transverse axis $A_T$. Since the central axis $A_V$ is vertical in FIG. 2, the lateral and transverse axes $A_L$, $A_T$ are horizontal. The vertical and lateral axes $A_V$, $A_L$ lie on a lateral plane $P_L$. The vertical and transverse axes $A_V$, $A_T$ lie on a transverse plane $P_T$.

The hanger 20 has a ring 24 with a transversely-extending through-hole 25 for receiving the harness 12 (FIG. 1), a neck 26 extending downward from the ring 24, and first and second crossbars 31 and 32 at the bottom of the neck 26.

Figure 3:
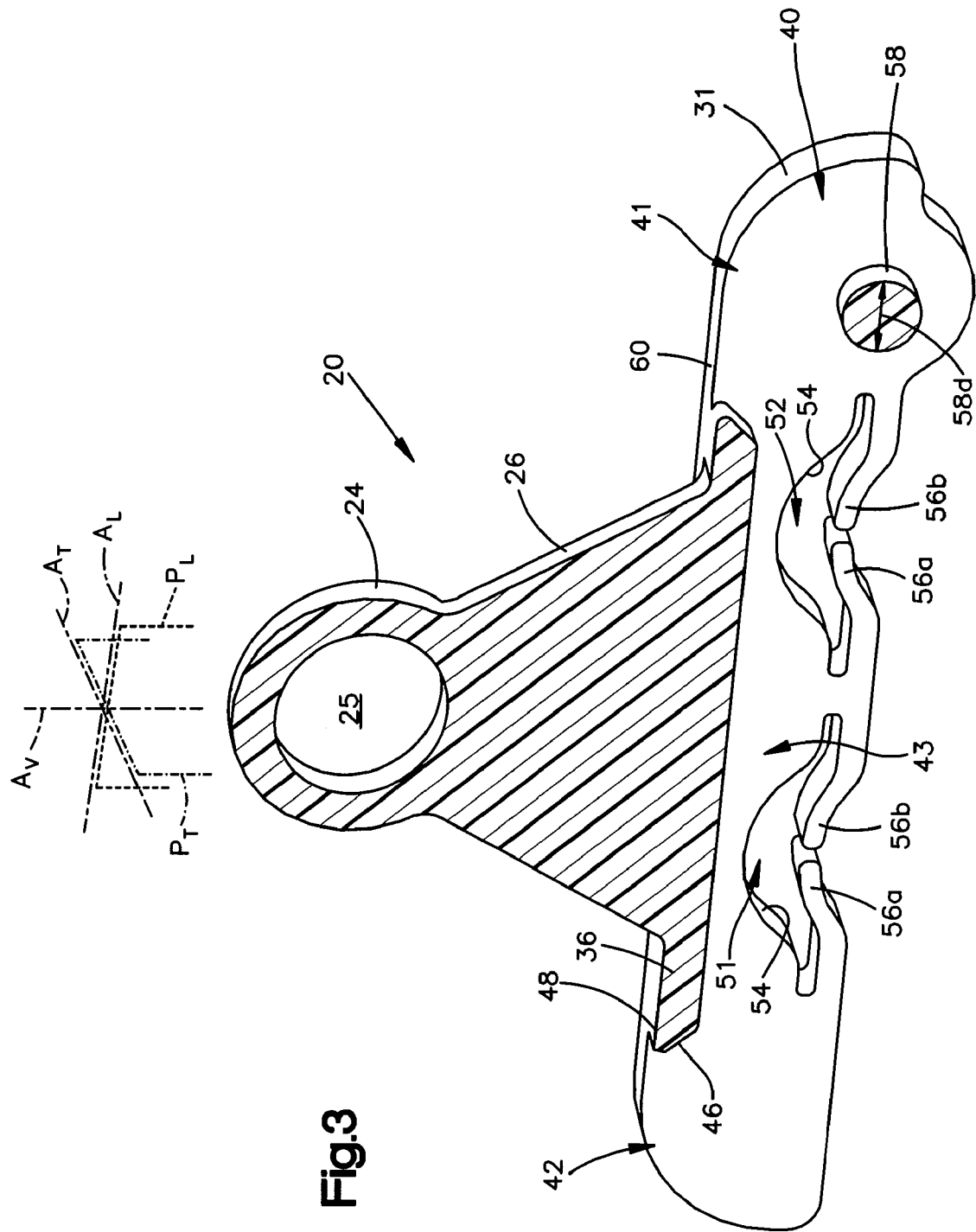
FIG. 3 is a perspective sectional view of the hanger taken at line 3-3 of FIG. 2, with the hanger and the axes shown in the same orientations as they appear in FIG. 2.

As shown in FIGS. 2-3, the crossbars 31 and 32 are generally planar and parallel with the lateral plane $P_L$. They are joined together by a joiner 36, which is a section of plastic adjoining both crossbars 31 and 32 and the bottom of the neck 26. The joiner 36 extends laterally along only a midsection of the crossbars 31 and 32 and vertically along only a top section of the crossbars 31 and 32. This leaves a gap 40 between the crossbars 31 and 32. The gap 40 includes three sections: a right-hand section 41 to the right ("right" with respect to the orientation in FIGS. 2-3) of the joiner 36, a left-hand section 42 to the left of the joiner 36, and a middle section 43 under the joiner 36. The left end of the joiner 36 has an inclined surface 46 facing both downward and laterally-outward and, above it, an upward-facing ledge 48.

The crossbars 31 and 32 are mirror images of each other relative to the lateral plane $P_L$. They are described as follows with respect to the first crossbar 31 shown in FIG. 3:

As shown in FIG. 3, each crossbar 31 has two identical upper pockets 51, 52 that are laterally spaced (i.e., spaced apart along the direction of the lateral axis $A_L$) along the bottom of the crossbar 31. Each pocket 51, 52 is defined by an upwardly-bowed top surface 54. In the pocket 51, two elastic tangs—designated as left tang 56a and right tang 56b—extend laterally toward each other from laterally-opposite sides of the pocket 51. They are spaced below the pocket's top surface 54 to provide room for them to flex upward.

A hinge pin 58, with a diameter 58d, extends transversely from one crossbar 31 to the other crossbar 32 across the right-hand section 41 of the gap 40. The lateral plane $P_L$ extends through the gap 40. The ring 24, the neck 26 and the joiner 36 are each symmetric about the lateral plane $P_L$.

Figure 4:
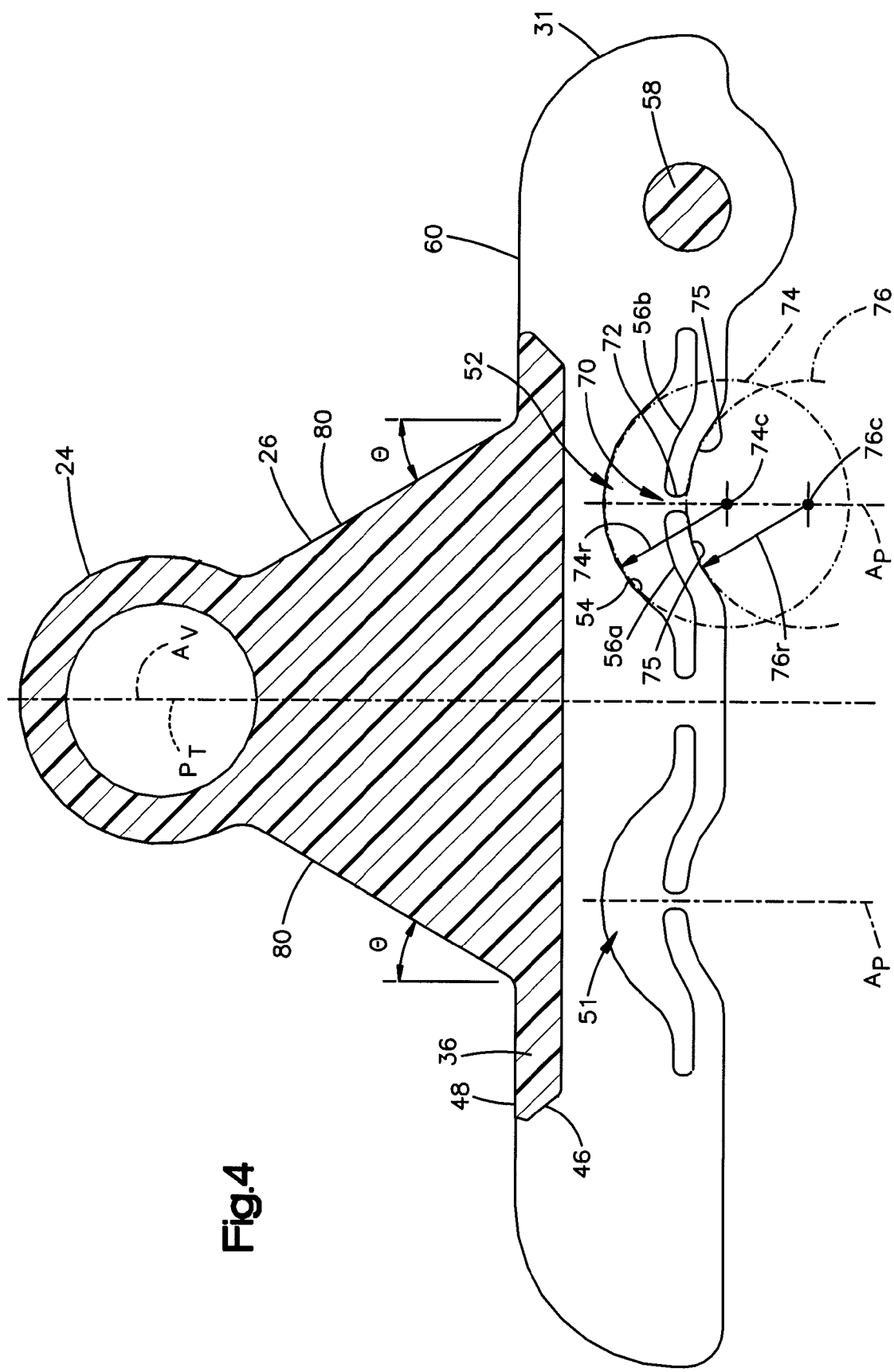
FIG. 4 is a plan sectional view of the hanger.

As shown in FIG. 4, the ring 24, the neck 26, and a top surface 60 of the crossbar 31 are symmetric about the transverse plane $P_T$. Each pocket 51, 52 has a vertical pocket axis $A_P$ about which the pocket's top surface 54 is symmetric. The axes $A_P$ of the pockets 51, 52 are spaced apart symmetrically about the transverse plane $P_T$. The pockets 51, 52 of the same crossbar 31 are mirror images of each other relative to the transverse plane $P_T$. Two adjacent pockets 51 of adjacent crossbars 31, 32 (FIG. 2) are mirror images of each other with respect to the lateral plane $P_L$.

As shown in FIG. 4, each pair of laterally-adjacent tangs 56a, 56b are mirror images of each other relative to the respective pocket axis $A_P$. A gap 70 between distal ends 72 of adjacent tangs 56a, 56b is centered on the pocket axis $A_P$. The pocket's top surface 54 follows an imaginary circle 74 with a center point 74c on the pocket axis $A_P$. The bottom surfaces 75 of adjacent tangs 56a, 56b define a common smooth upwardly-bowed curve. In this example, that curve is a circle 76 with a center point 76c on the pocket axis $A_P$. Its radius 76r equals, at least approximately, the radius 74r of the pocket's top surface 54.

The above aspects of symmetry yield a tendency for the clamp's center of gravity to lie on the central axis $A_V$, so that the clamp 10 will hang from the harness 12 with its central axis $A_V$ substantially vertical. The symmetry also keeps the lines spaced evenly, and thus optimally, apart. The symmetry of the tangs 56a, 56b tends to keep the hose 5, 6 (FIG. 1) centered at the bottom of the pocket 51, 52.

As shown in FIG. 4, the neck 26 is generally planar, and lies parallel with and on the lateral plane $P_L$. Two laterally-opposite straight peripheral edges 80 of the neck 26 are inclined laterally-outward from vertical by an angle θ. That angle θ is in the range of about 15° to about 45°, and is about 30° in this case. This inclination ensures that a continuous vertical straight line of material, extending from the ring 24 to the crossbars 31 and 32, is maintained even as the clamp 10 is laterally pivoted up to about 30°. Such pivoting can occur due to downward tugging by one of the lines 5, 6.

Clasp of the Clamp

Figure 5:
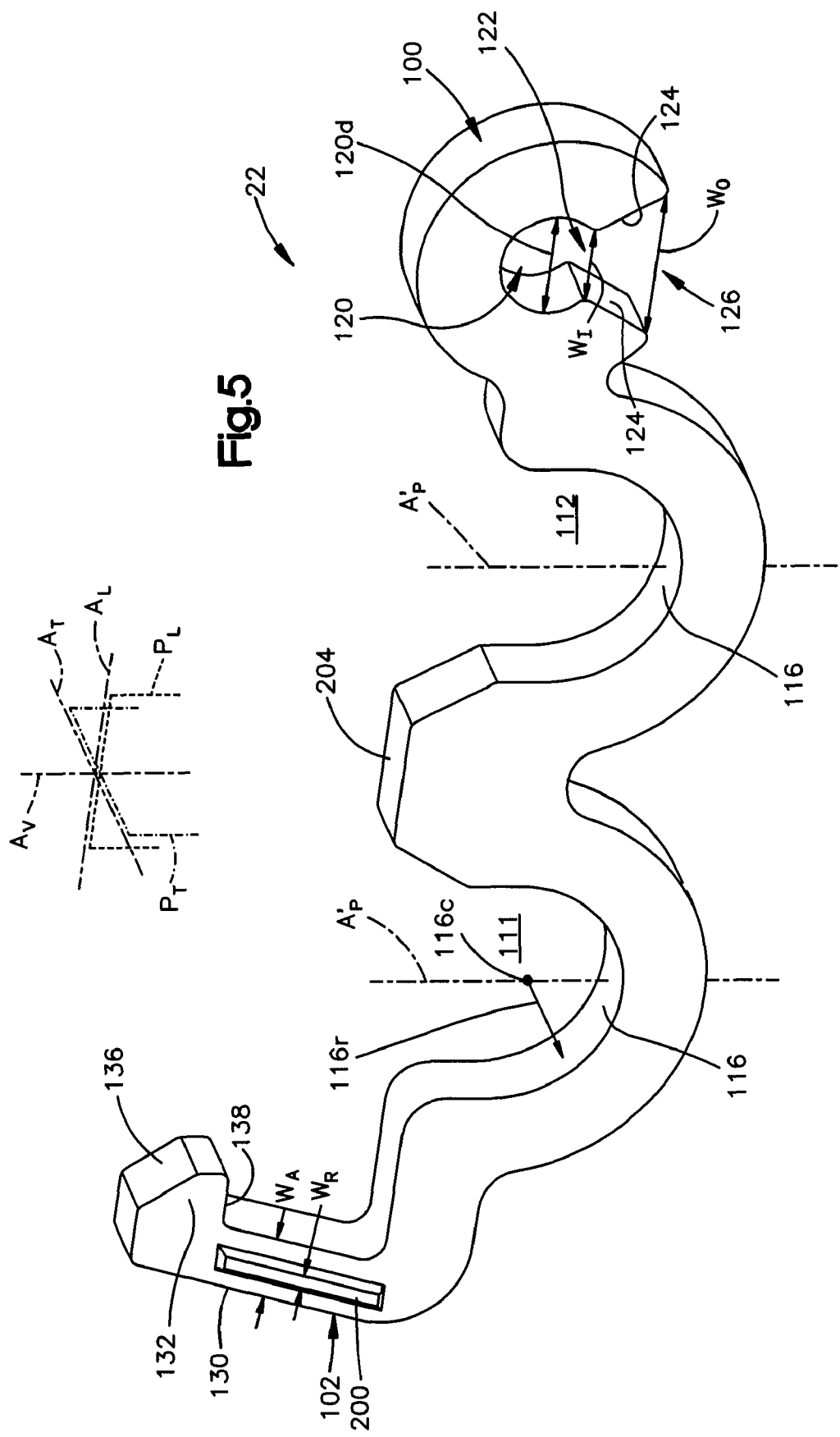
FIG. 5 is a perspective view of the clasp, with the clasp and the axes shown in the same orientations as they appear are in FIG. 2.

In FIG. 5, the clasp 22 is in the same orientation relative to the axes $A_V, A_L, A_T$ as it is in FIG. 2. The clasp 22 has a hinge knuckle 100 at one end, a hook 102 at a laterally-opposite end, and laterally-spaced lower pockets 111 and 112 located laterally between the knuckle 100 and the hook 102. Each lower pocket 111, 112 is centered on a vertical pocket axis $A'_P$. It is defined by a semicircular bottom surface 116 with a center point 116c on the pocket axis $A'_P$ and a radius 116r. The radius 116r is about 20% smaller than the radii 74r and 76r of the top surface 54 and the tangs 56a, 56b (FIG. 4).

The hinge knuckle 100 is C-shaped. It defines a circular through-hole 120 with a diameter 120d equaling the diameter 58d of the hinge pin 58 (FIG. 3). The knuckle 100 has an inner opening 122 to the through-hole 120 with a width $W_1$ that is smaller than the hole's diameter 120d. Two guide surfaces 124 extend from opposite ends of the inner opening 122 to opposite ends of an outer opening 126. The outer opening's width $W_O$ is larger than the hole's diameter 120d.

The hook 102 includes an arm 130 projecting upward and a finger 132 projecting laterally inward toward the knuckle 100. The finger 132 has an inclined upper surface 136 that faces both upward and laterally inward. Directly below it, a bottom surface 138 faces downward.

Two vertically-extending ribs 200 project transversely from transversely-opposite side surfaces of the arm 130. The ribs 200 are horizontally centered on the arm 130. They have a width $W_R$ that is less than 40% of the width $W_A$ of the arm 130.

When latched in a closed position of FIG. 2, the clasp 22 lies on, and is symmetric about, the lateral plane $P_L$. Each of its lower pockets 111, 112 is located transversely between, and aligned with, a respective pair of upper pockets 51, 52 to define an transversely-extending orifice 139 configured to surround and capture a transversely-extending section of hose 5, 6. The orifice 139 is defined by the clasp 22 in conjunction with either crossbar 31, 32. It is alternatively defined by the clasp 22 in conjunction with both crossbars 31, 32 together. The clasp 22 combined with either crossbar 31, 32 or both crossbars comprises an orifice structure. Each lower pocket axis $A'_P$ is between, and coplanar with, a respective pair of upper pocket axes $A_P$.

Procedure for Assembling and Using the Clamp

FIGS. 6-10 illustrate successive steps in a procedure for assembling and using the clamp 10:

In FIG. 6, the clasp's hinge knuckle 100 enters the gap 40 in the hanger 20. The hinge pin 58 is moved (arrow 140) through the hinge knuckle's outer opening 126 and guided by the guide surfaces 124 toward the knuckle hole 120. While passing through the inner opening 122, sliding engagement of the pin 58 against guide surfaces 124 forces the guide surfaces 124 apart. This widens the inner opening 122 sufficiently to let the pin 58 pass into knuckle hole 120.

After the pin 58 snaps into the knuckle hole 120, as shown in FIG. 7, the guide surfaces 124 return to their initial positions. The pin 58 and the knuckle 100 together form a hinge 150 within the right-hand section 41 of the gap 40. The clamp 10 thus needs no fasteners. The harness 12 is inserted transversely through the hole 25 in the ring 24 to suspend the ring 24 from the harness 12.

Figure 8:
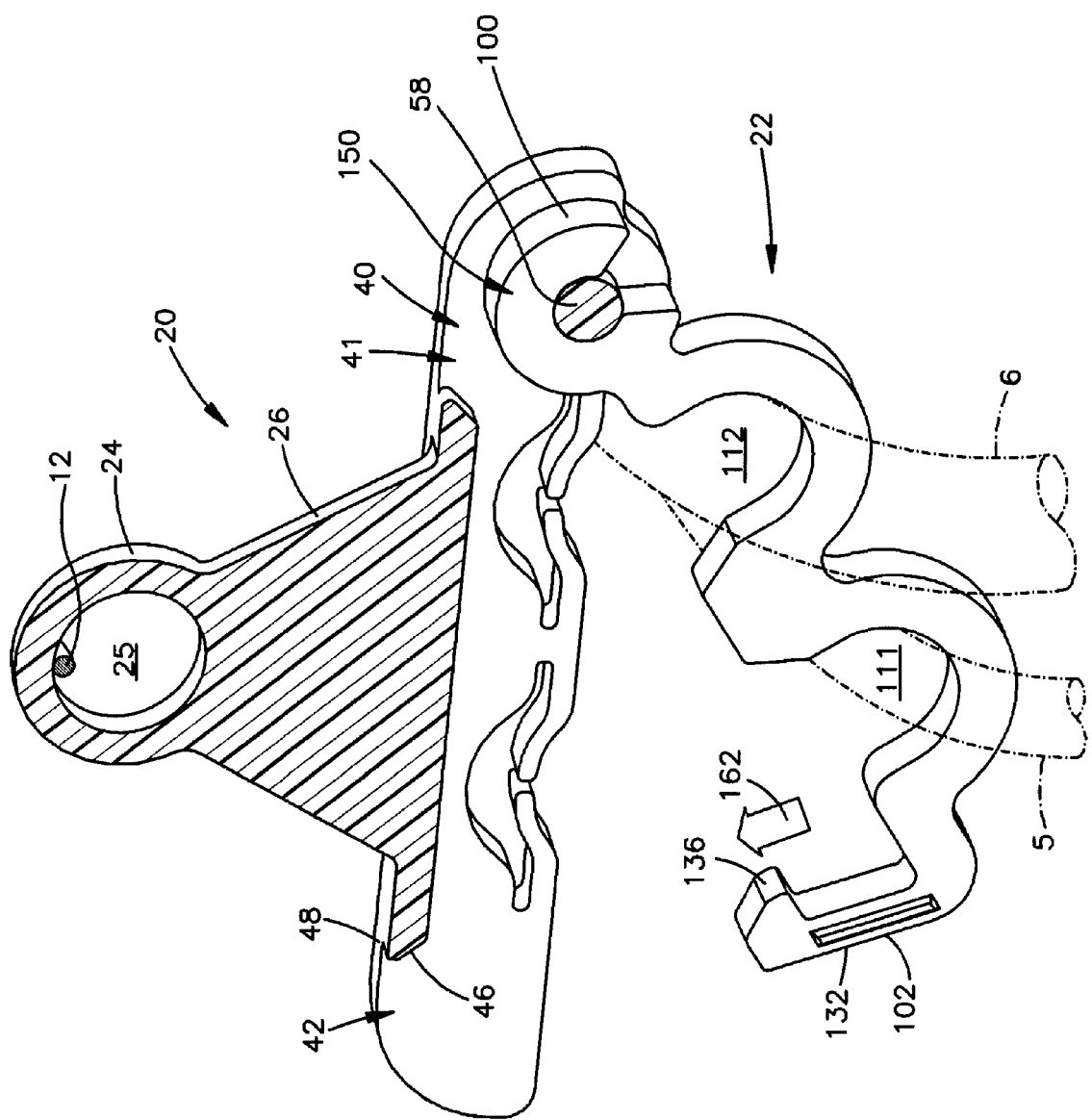

Then, the clasp 22 is rotated (arrow 161) about the hinge 150 toward the hanger ledge 48 until the clasp pockets 111, 112 are oriented to enable supporting the hoses 5, 6 as shown in FIG. 8. The two hoses 5, 6 are laid into the clasp's two lower pockets 111, 112, and the clasp 22 is rotated (arrow 162) further upward.

Figure 9:
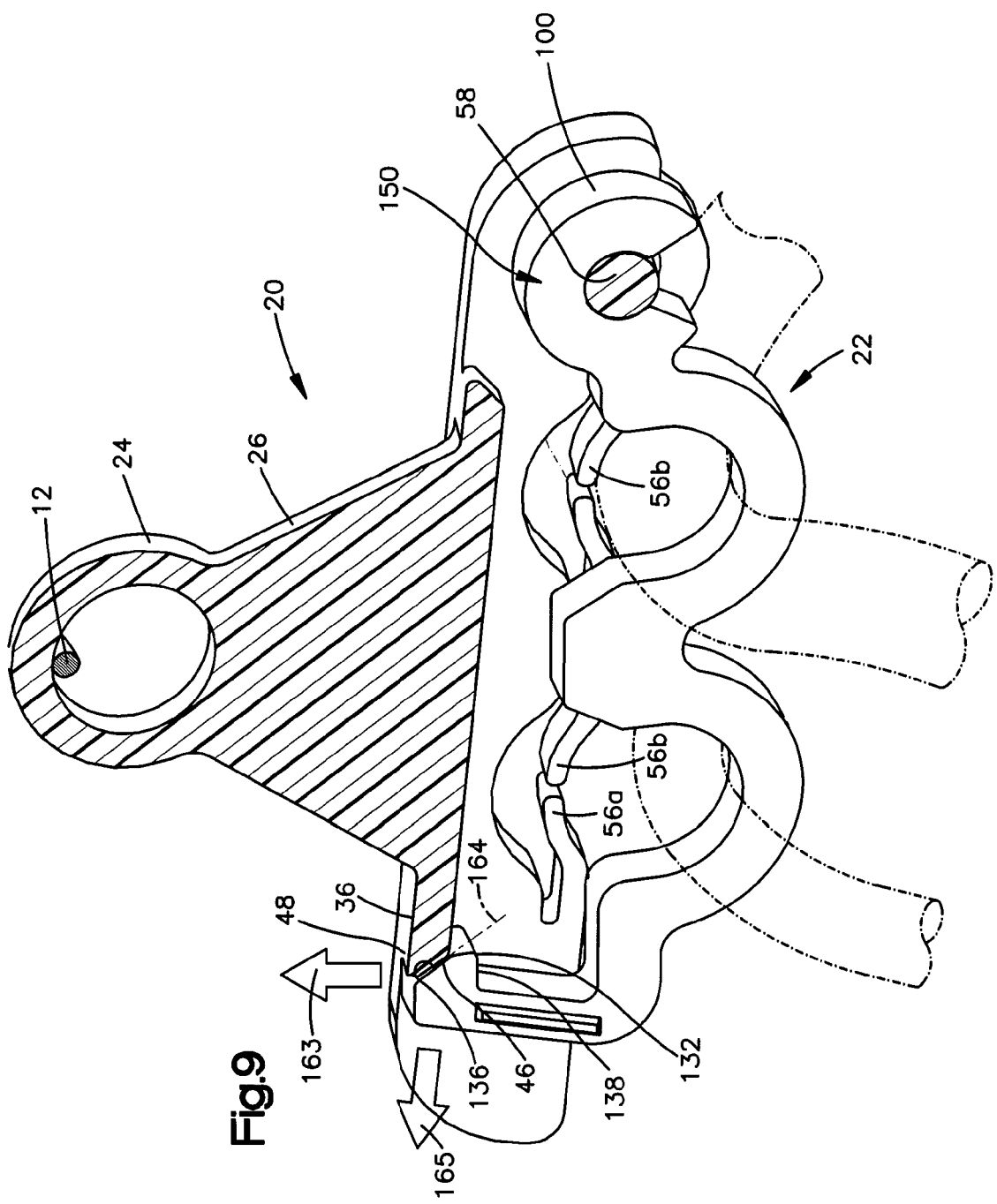

As shown in FIG. 9, as the clasp 22 continues upward (arrow 163), the inclined upper surface 136 of the hook finger 132 slides against the inclined bottom surface 46 of the joiner 36. The sliding surfaces 136, 46 are inclined at the same angle, as indicated by dashed line 164. This angle, of about 45°, is configured to cause the clasp's finger 132 to be urged laterally outward (arrow 165, directed away from the hinge) by the finger sliding upward against the joiner 36. The laterally outward movement of the finger 132 is enabled by elastic flexing of the clasp 22.

Figure 10:
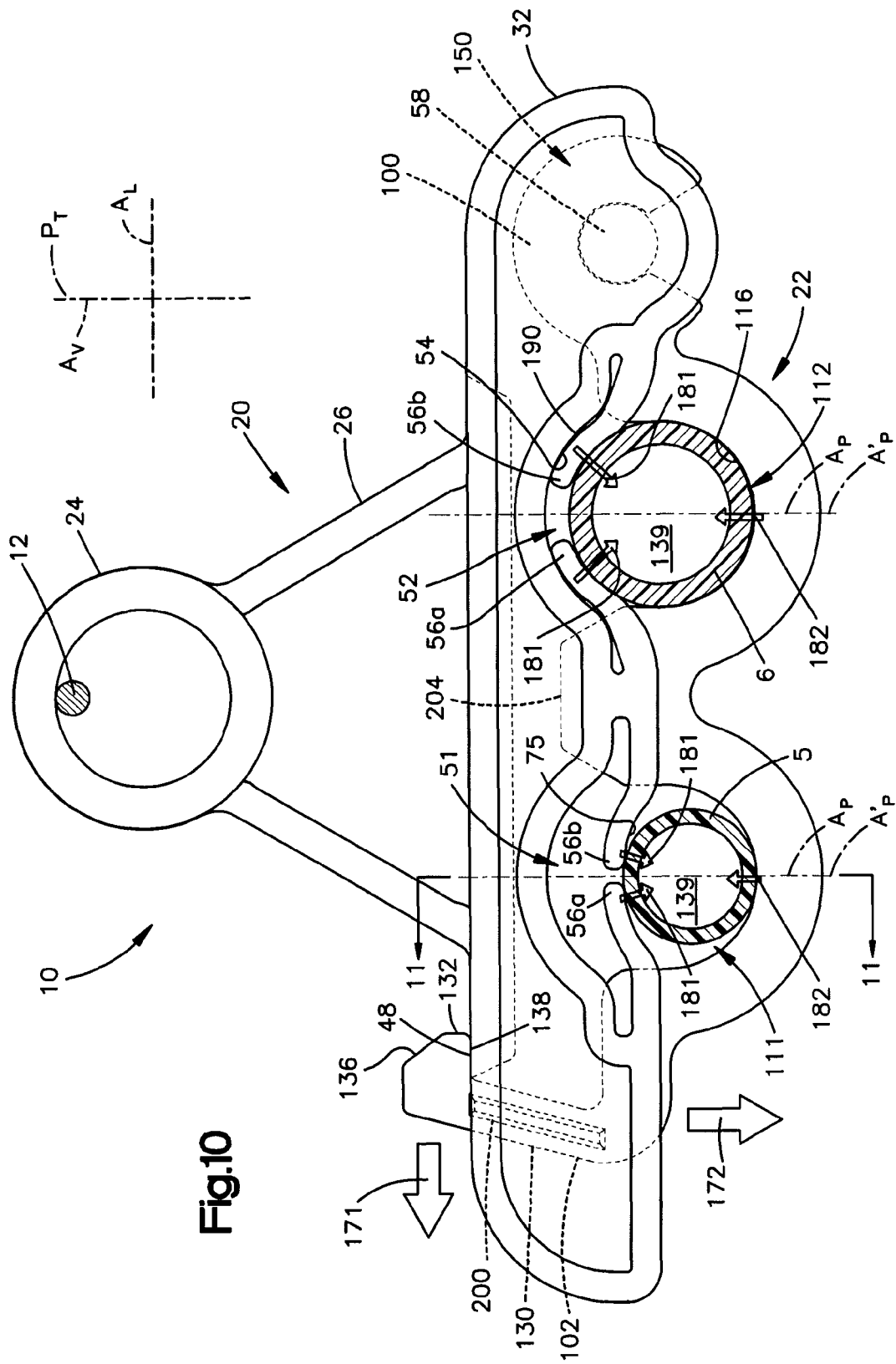
FIG. 10 is a plan view of the clamp in the closed position securing a hose.

As the finger's bottom surface 138 upwardly passes the joiner's ledge 48, it snaps laterally-inward to rest on the ledge 48 as shown in FIG. 10. The clasp 22 is thus latched in a closed position.

To release the clasp 22, a user manually presses laterally-outward against the inclined top surface 136 of the hook finger 132 to move the finger 132 laterally outward (arrow 171) until the hook finger 132 clears the ledge 48. The clasp 22 can then be pivoted downward (arrow 172) into the open position (FIGS. 8-9).

Features of the Clamp in the Closed Position

In the closed position shown in FIG. 10, the finger's bottom surface 138 rests on the ledge 48. Each lower pocket axes $A'_P$ (FIG. 4) of the clasp 22 is transversely-between, and coplanar with, a pair of upper pocket axes $A_P$ of the hanger 20. Each lower pocket 111 is aligned with two transversely-adjacent upper pockets 51 of the two crossbars 51, 52 to define an orifice 139 that surrounds and captures a hose 5.

The bottom surface 75 of each tang 56a, 56b serves as an upper hose-engaging surface. It elastically applies, to the respective hose 5, 6, a downward force 181 inclined toward the central axis $A_P$ of the respective pocket 51. The inclination is increased with increased size of the hose 5, 6. Similarly, the bottom surface 116 of each lower pocket 111, 112 serves as a lower hose-engaging surface that applies an upward force 182 to the hose 5, 6. The forces 181, 182 frictionally inhibit the hoses 5, 6 from moving laterally within the pockets 51, 52 or transversely through the pockets 51, 52. The tangs 56a, 56b thus immobilize the hose 5, 6 even if the hose 5, 6 is diametrically smaller than the orifice 139. The tangs 56a, 56b can flex upward sufficiently to enable the orifice 139 to accommodate a range of hose diameters.

The downward force 181 on each hose 5, 6 from both gravity and the tangs 56a, 56b urges the hose 5, 6 downward toward the center $A_P$ of the pocket 111, 112 as indicated above. This enhances the downward force of the finger 132 against the ledge 48. It also bows the clasp 22 downward, which urges the hook 102 toward the hinge 100, which reinforces the laterally-inward force of the hook's arm 130 against the joiner 36, which in turn reinforces the hook's grasp of the joiner 36.

The larger hose 6 in this example presses the tangs 56a, 56b against the top surface 54 of the pocket 52. The top surfaces 190 of the tangs 56a, 56b closely follow the upper pocket's top surface 54 and engage the top surface 54 along a circular line of contact.

The two ribs 200 press against the two crossbars 31 and 32 to frictionally inhibit dislodging of the hook 102 from its latched position when vibrated. The ribs 200 provide a narrower band of contact with the crossbars 31 and 32 than if the entire width $W_A$ (FIG. 5) of the arm 130 were contacting the crossbars 31 and 32. This concentrates the contact pressure.

Figure 11:
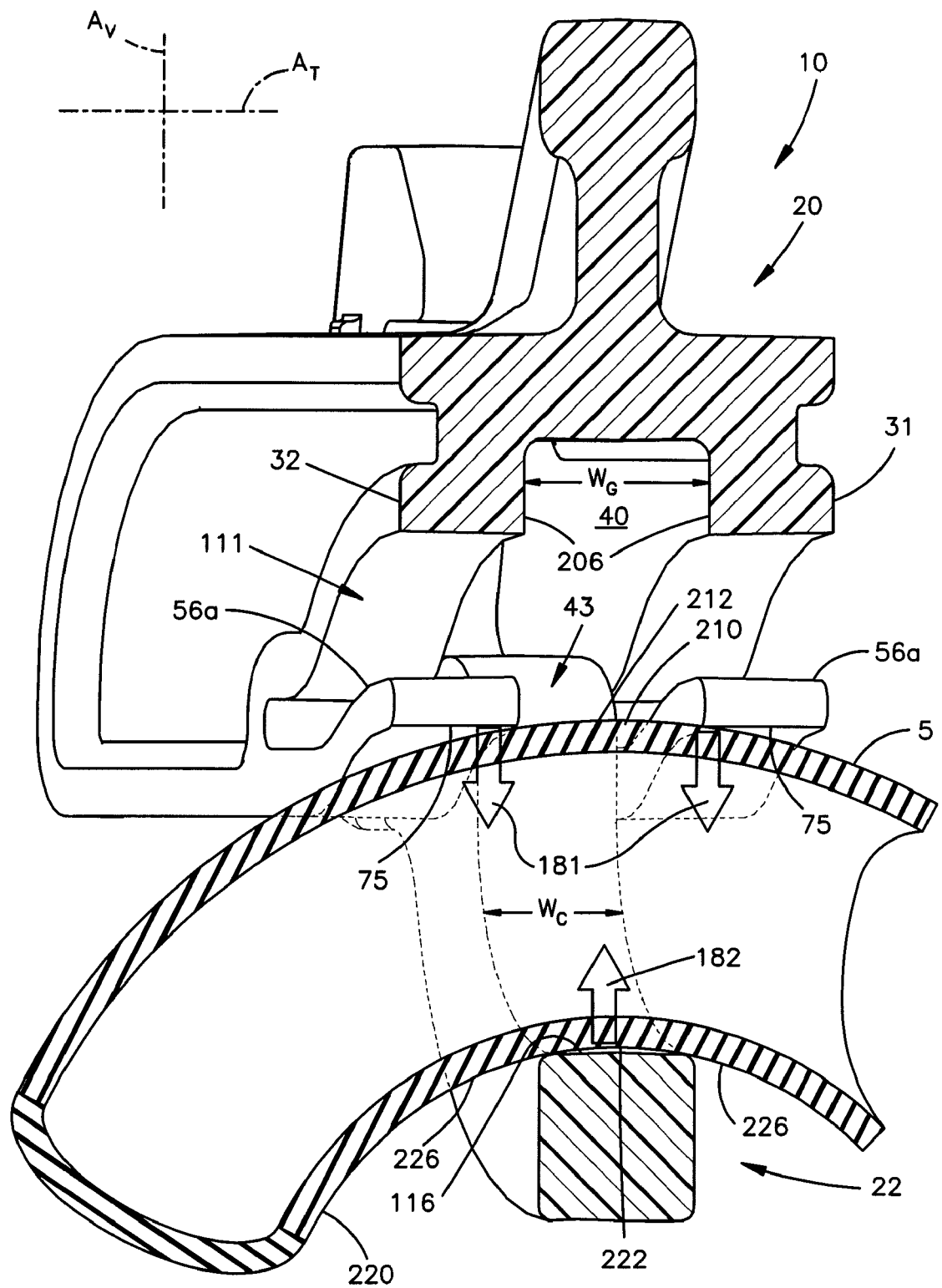
FIG. 11 is a perspective sectional view taken at line 11-11 of FIG. 10.

As shown in FIGS. 10-11, the clasp 22 has a uniform transversely-extending width $W_C$ that is narrower than transversely-extending width $W_G$ of the gap 40 between the crossbars 31 and 32. This provides transverse play between the clasp 22 and the crossbars 31 and 32. This, in turn, avoids friction between the clasp 22 and the crossbars 31 and 32 that would resist the rotation of the clasp 22 toward the closed position.

The clasp 22 has, between each neighboring pair of pockets 111, 112, an upward contortion-resisting projection 204 (FIGS. 5 and 10). The projection 204 projects into the gap 40 in the hanger 20 when the clasp 22 is in the closed position. The projection 204 is captured by and between the two surfaces 206, of the two crossbars 31 and 32, that bound the gap 40. This inhibits transverse contortion of the clasp 22.

FIG. 11 shows one pair of adjacent transversely-spaced left tangs 56a ("left" with respect to their positions in FIG. 10) of adjacent crossbars 31 and 32. This pair of left tangs 56a is laterally spaced from the pair of right tangs 56b (one right tang 56b from each crossbar 31, 32 in FIGS. 9-10).

In FIG. 11, the gap 40 between the crossbars 31 and 32 provides a tang-free gap located transversely between the tangs 56a. The two transversely-spaced upper hose-engaging surfaces 75 of the tangs 56a apply the respective downward forces 181 against the hose 5. Similarly, the lower hose-engaging surface 116 located directly below the tang-free gap 40 applies, to the hose 5, the upward force 182 transversely-centered between the downward forces 181.

This orientation of the three forces 181, 182 urges the top 210 of the hose 5 to bow upward between the tangs 56a, with a peak 212 located slightly above the upper hose-engaging surfaces 75 and thus captured by and between the tangs 56a. It thus helps prevent transverse movement of the hose 5.

The three forces 181, 182 further urge the bottom 220 of the hose 5 to bow upward, yielding a peak 222 spaced above the lower hose-engaging surface 116. This inhibits the hose 5 from slipping transversely by concentrating the upward force 182 at two laterally-opposite corners of the with lower hose-engaging surface, and also by capturing the lower hose engaging surface 116 by and between transversely-opposite drooping sections 226 of the hose 5.

OTHER EXAMPLES

In FIG. 10, the number of pockets 51, 52 on the hanger 20 matches the number of pockets 111, 112 on the clap 22, which also equals the number of orifices 139 (FIG. 10). Although this number is two in the above example, it can be one or more. For example, the number is three in clamp 10' of FIG. 12 and is four in clamp 10" of FIG. 13. Each clamp 10', 10" has two side-by-side crossbars 31', 31" and 32', 32", a laterally-extending series of upper pockets 51'-53' and 51"-54" and a laterally-extending series of lower pockets 111'-113', 111"-114". Each corresponding pair of upper and lower pockets, for example upper pocket 51' and lower pocket 111', form an orifice 139', 139". The orifices 139', 139" are uniformly spaced apart, symmetrically about the respective hanger's central axis $A_V$.

Figure 12:
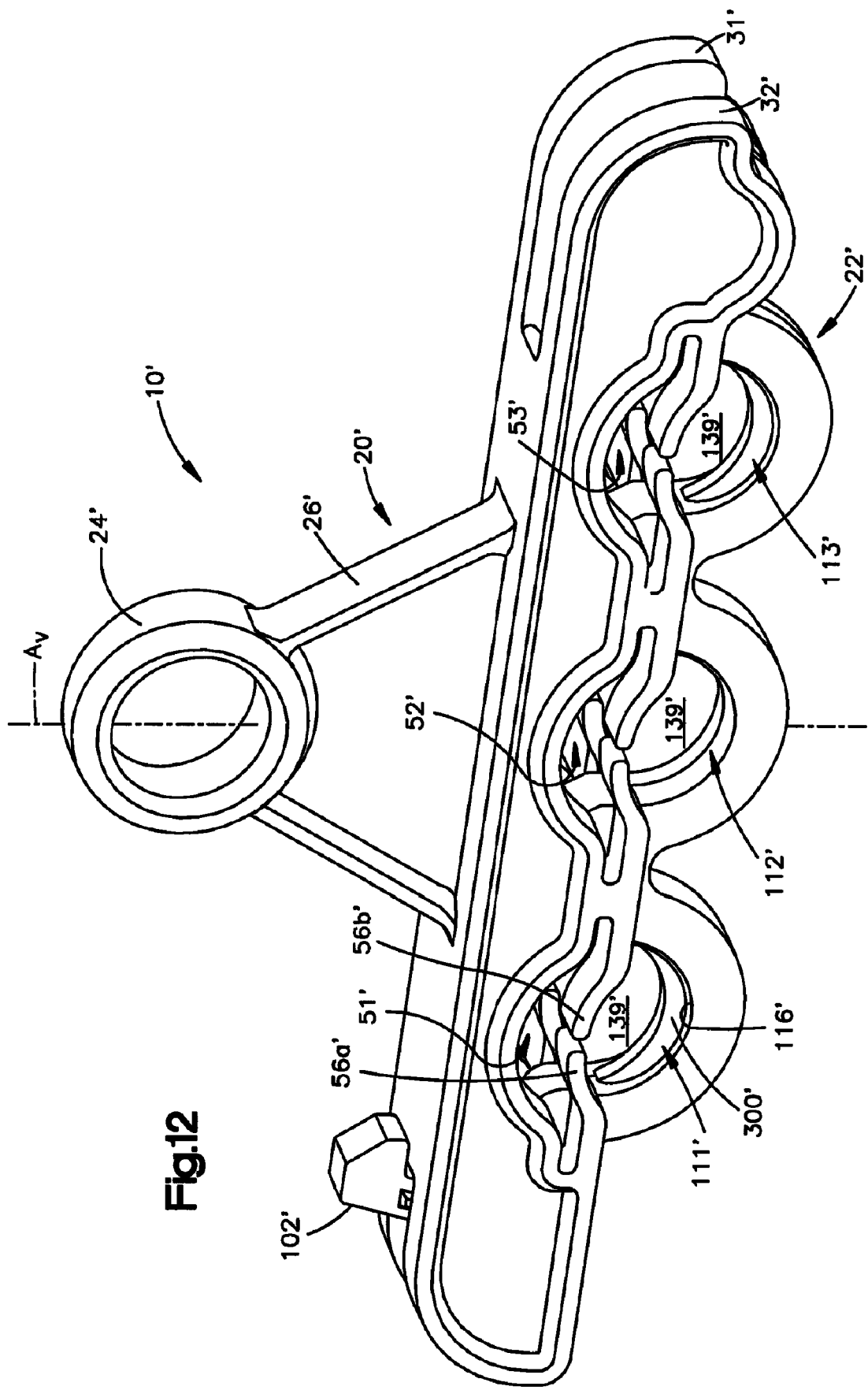
FIG. 12 is a perspective view of a three-pocket hose clamp, with parts labeled with primed numerals that correspond to numerals for corresponding parts in FIGS. 1-11.
Figure 13:
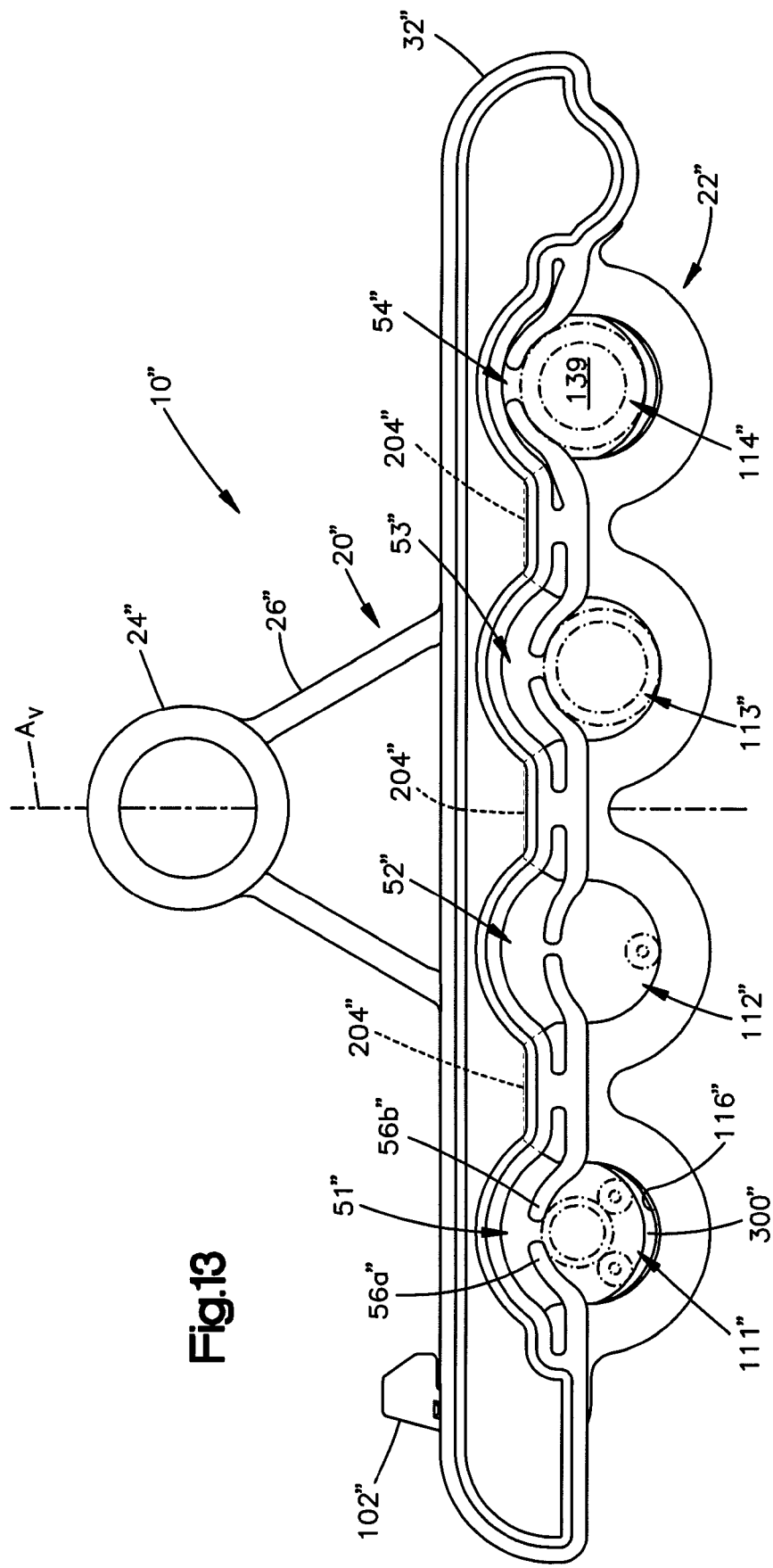
FIG. 13 is a perspective view of a four-pocket hose clamp, with parts labeled with double-primed numerals that correspond to numerals for corresponding parts in FIGS. 1-11.

In FIGS. 12-13, the laterally-outermost lower pockets (111', 113', 111", 114") have a rib 300', 300" extending upward from their bottom pocket surfaces 116', 116". This yields a transversely-narrower hose-engaging surface, which concentrates the pressure on the hose.

The first pocket 51" in FIG. 13 holds three flexible lines: in this case two cables and a hose that together press the tangs 56a", 56b" upward. The second pocket 52" in FIG. 13 holds only one line, in this case a cable, that is diametrically too small to simultaneously engage the tangs 56a", 56b" and the clasp 22". Transverse bending or contortion of the clasp 22" over its relatively long span of multiple pockets 111"-114" under the weight of multiple lines is reduced by the existence of the contortion-resisting projection 204" between each pocket 51", 52", 53".

Although the clamps 10, 10', 10" in these examples support flexible lines for a tractor trailer rig, the clamps 10, 10', 10" can be used in any application requiring support of flexible lines, such as a factory. Although the clamps 10, 10', 10" are called "hose clamps", because they can support hydraulic and pneumatic hose lines, they are for supporting any flexible line.

Figure 14:
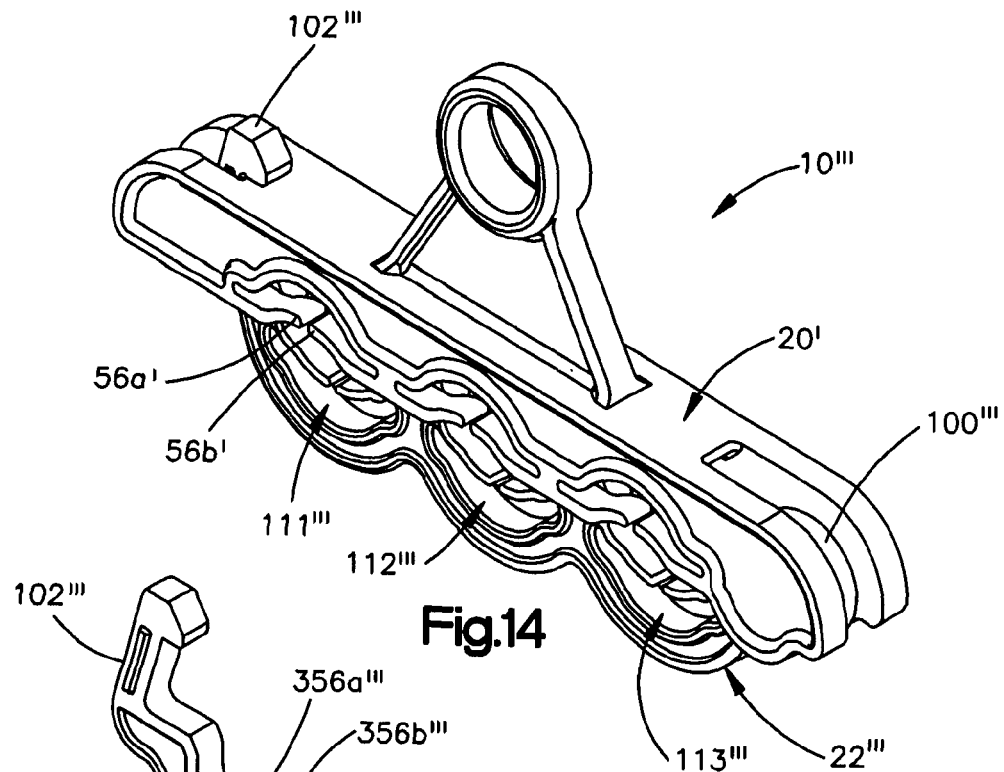
FIG. 14 is a perspective view of another three-pocket hose clamp, with parts labeled with triple-primed numerals that correspond to numerals for corresponding parts in FIGS. 1-13.
Figure 15:
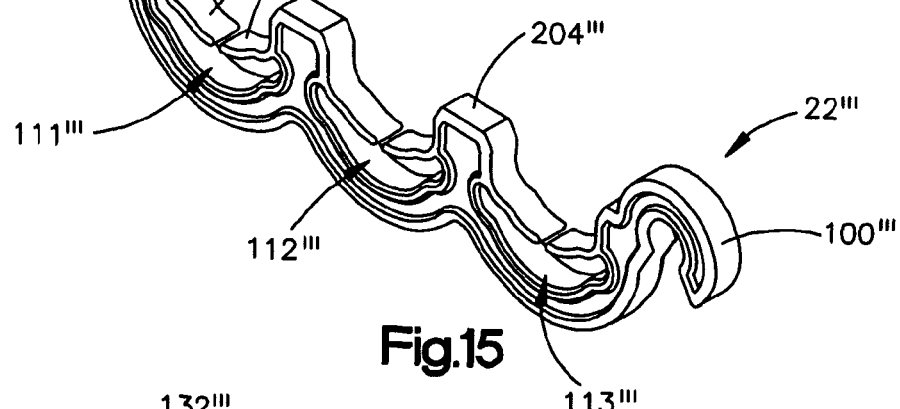
FIGS. 15-16 are perspective and plan views of a clasp of the clamp of FIG. 14.
Figure 16:
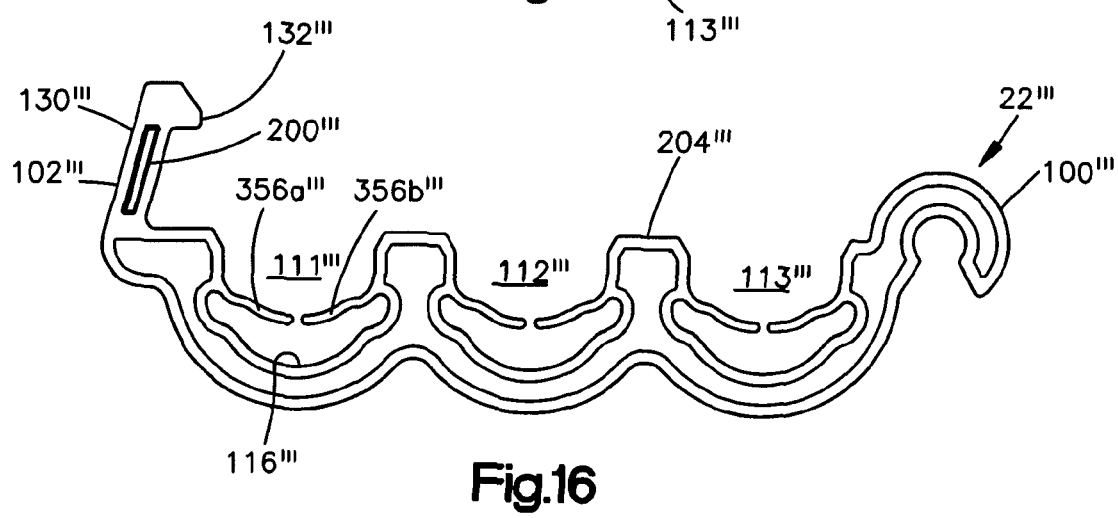

FIG. 14 shows a second three-pocket clamp 10'''. Its hanger 20' is the same as hanger 20' of the first three-pocket clamp 10' of FIG. 12. As shown in FIGS. 15-16, the clamp 10''' of FIG. 14, like the clamp 10' of FIG. 12, has a clasp 22''' with a hinge knuckle 100''' at one end, a hook 102''' at its laterally opposite end, and three pockets 111''', 112''', 113''' laterally in-between.

The clasp 22''' in FIGS. 14-16 differs from the clasp 22' of FIG. 12 in that it has, in each pocket 111''', 112''', 113''', two elastic tangs 356a''', 356b''' extending laterally toward each other from laterally-opposite sides of the pocket. These are lower tangs 356a''', 356b''' sized and shaped like the upper tangs 56a', 56b'. The lower tangs 356a''', 356b''' are spaced above the bottom surface 116''' of the respective pocket and are configured to elastically urge a hose (not shown) upward. A sufficiently thick hose can be simultaneously pressed by all four tangs toward a center of the pocket. That is because the upper left tang 56a', the upper right tang 56b', the lower left tang 356a''', and the lower right tang 356b''' each apply, to the hose, a force directed, at least approximately, toward the diagonally-opposite tang.

The scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

The invention claimed is:

1. A hose clamp comprising:
   a hanger configured to be suspended from a harness;
   a hinge; and
   a clasp defining lower pockets and being rotatably attached to the hanger by the hinge, the clasp being configured to rotate about the hinge between an open position, in which flexible lines can be laid into the pockets, and a closed position in which the hanger and the clasp together surround and capture the flexible lines in the respective pockets;
   a hook configured to latch the clasp in the closed position, the hook comprising
      a hook arm that projects upward in the clasp's closed position; and
      a hook finger that projects laterally inward from the hook arm and rests on a ledge to latch the clasp in the closed position; and
   two tangs coupled to the hanger and extending toward each other, each tang configured to apply an elastic force downward against one of the flexible lines toward a corresponding lower pocket of the lower pockets,
   wherein the hook and the clasp are configured for the hook finger to be manually forced laterally outward, against elastic bias of the clasp, to slide the hook finger laterally off the ledge to release the clasp from the closed position.

2. The clamp of claim 1 wherein the hinge includes a hinge pin molded as a one-piece unit with the hanger and a hinge knuckle molded as a one-piece unit with the clasp, with the pin configured to be snapped into the knuckle by a user.

3. The clamp of claim 1 wherein the pockets are between the hook and the hinge.

4. The clamp of claim 3 wherein the hook finger projects toward the hinge,
   wherein the finger is moved in a direction directed away from the hinge in order to unlatch the clasp, and
   wherein the hook further comprises two substantially vertically-extending ribs projecting transversely from transversely-opposite side surfaces of the hook arm.

5. The clamp of claim 4 wherein the hanger and the clasp each have a sliding surface, and movement of the clasp toward the closed position causes the sliding surfaces to slide against each other, which in turn forces the finger in the direction directed away from the hinge due to an angle of inclination of at least one of the sliding surfaces.

6. The clamp of claim 1 wherein the clasp includes, between each neighboring pair of pockets, a projection that projects into a gap in the hanger when the clasp is in the closed position for surfaces of the hanger bounding the gap to inhibit contortion of the clasp.

7. The clamp of claim 1 wherein the hanger is located on mutually-perpendicular lateral and transverse axes and, in the clasp's closed position, the lower pockets are spaced laterally apart, and the hanger has, above each lower pocket, two hose-engaging surfaces spaced transversely apart.

8. A hose clamp defined with respect to mutually-perpendicular vertical, lateral and transverse axes, comprising:
   a hanger configured to be suspended from a harness, having transversely-opposing surfaces bounding a gap in the hanger; and
   two laterally-spaced upper hose engaging surfaces; and
   a clasp configured to be attached to the hanger in a closed position in which the clasp has:
      laterally-spaced first and second attachment locations at which the clasp is attached to the hanger;
      laterally-spaced first and second pockets, located laterally between the attachment locations, for supporting hoses; and
      a projection, located between the pockets, that moves, as the clasp is moved into the closed position, upward into the gap to be transversely captured by said transversely-opposing surfaces,
   wherein the two laterally-spaced upper hose engaging surfaces are configured to apply a substantially vertical elastic force against one of the hoses.

9. A hose clamp defined relative to mutually-perpendicular vertical, lateral and transverse axes, the clamp comprising:
   a ring with a transversely-extending hole for receiving a harness to suspend the ring from the harness;
   a neck extending downward from the ring;
   an orifice structure connected to the ring by the neck, the orifice structure having a laterally-spaced orifices, each configured to surround and capture a hose line;
   two laterally-spaced upper hose-engaging surfaces adjoining one of the laterally-spaced orifices and configured to press the hose line against a lower surface of the one of the laterally-spaced orifices;
   with the neck having straight laterally-opposite side edges that are inclined downward and laterally-outward by an angle of 15°-45° relative to vertical.

10. The clamp of claim 9 wherein a pocket structure includes first and second laterally-extending side-by-side crossbars that define laterally-spaced upper pockets that partially define the orifices.

11. A hose clamp defined relative to mutually-perpendicular vertical, lateral and transverse axes, the clamp comprising:
   a hanger configured to be suspended from a harness, the hanger including:
      a gap bounded by transversely-opposing first and second surfaces of the hanger;
      a hinge pin extending transversely across the gap; and
      a ledge facing upward; and
   a clasp including:
      a hinge knuckle configured to form a hinge with the hinge pin about which the clasp can rotate upward toward and into a closed position in which the hanger and the clasp together surround and capture a hose;

a hook arm that, in the clasp's closed position, projects upward;

a hook finger that projects laterally inward from the hook arm and rests on the ledge to latch the clasp in the closed position; and two substantially vertically-extending ribs projecting transversely from transversely-opposite side surfaces of the hook arm, wherein the clamp is configured for the hook finger to be manually forced laterally outward, against elastic bias of the clasp, to slide the hook finger laterally off the ledge to release the clasp from the closed position, and wherein the first and second surfaces of the hanger are configured to press the hose downward and toward the clamp in the closed position.

12. The clamp of claim 11 wherein the hanger and the finger have respective sliding surfaces that slide against each other as the clasp is rotated upward toward the closed position, with at least one of the sliding surfaces being inclined so that the sliding of the surfaces against each other as the finger moves upward forces the finger laterally outward.

\* \* \* \* \*